US011968938B2

(12) United States Patent
Bellamy (10) Patent No.: US 11,968,938 B2
(45) Date of Patent: Apr. 30, 2024

(54) METHOD AND SYSTEM FOR INTENSIVE BIOLOGICAL HYDROSYNTHESIS, ENERGY GENERATION AND STORAGE, AND/OR TOPSOIL RESTORATION

(71) Applicant: VRM International Pty Ltd, Bohle (AU)

(72) Inventor: Kenneth Michael Bellamy, Townsville (AU)

(73) Assignee: VRM International Pty Ltd, Bohle (AU)

( * ) Notice: Subject to any disclaimer, the term of this patent is extended or adjusted under 35 U.S.C. 154(b) by 227 days.

(21) Appl. No.: 16/887,173

(22) Filed: May 29, 2020

(65) Prior Publication Data
US 2021/0368691 A1 Dec. 2, 2021

(51) Int. Cl.
*A01G 9/02* (2018.01)
*B09C 1/08* (2006.01)
(Continued)

(52) U.S. Cl.
CPC ............... *A01G 9/028* (2013.01); *B09C 1/08* (2013.01); *B65D 85/52* (2013.01); *C01B 5/00* (2013.01);
(Continued)

(58) Field of Classification Search
USPC .......... 47/65, 65.5, 66.7, 79, 48.5, DIG. 10, 47/62 R, 63
See application file for complete search history.

(56) References Cited

U.S. PATENT DOCUMENTS 4,052,818 A 10/1977 Hagerty
4,056,899 A * 11/1977 Close ............... A01G 27/00
47/79
(Continued)

FOREIGN PATENT DOCUMENTS

AU 2012283757 A1 1/2014
AU 2012283757 B2 11/2014
(Continued)

OTHER PUBLICATIONS

University of Vermont UVM ScholarWorks, 2017, The Use of Bokashi as a Soil Fertility Amendment in Organic Spinach Cultivation, Dana Mae Christel [retrieved from the internet Feb. 14, 2023, https://scholarworks.uvm.edu/cgi/viewcontent.cgi?article+1677&contect+graddis] 151 pages.*

(Continued)

*Primary Examiner* — Andrea M Valenti
(74) *Attorney, Agent, or Firm* — Cooper Legal Group LLC (57) ABSTRACT

A growing unit for biological hydrosynthesis, energy generation and storage and/or topsoil restoration, the growing unit comprising: a container configured for growing plants and containing a growth media located therein; a reservoir located in a lower portion of the container and associated with an outlet portion of the container, and a substantially vertical liquid inlet pipe associated with the reservoir, wherein the growth media comprises a mixture including a first catalyst, wherein the first catalyst stimulates formation of a humified soil and wherein the growth media is amended with an irrigation liquid which stimulates biological activity in the growth media and in and adjacent to the reservoir.

14 Claims, 3 Drawing Sheets

(51) Int. Cl.
    *B65D 85/52*     (2006.01)
    *C01B 5/00*     (2006.01)
    *C05F 11/00*     (2006.01)
    *E02B 9/02*     (2006.01)
    *E02B 13/00*     (2006.01)

(52) U.S. Cl.
    CPC ............... *E02B 9/02* (2013.01); *E02B 13/00* (2013.01); *C05F 11/00* (2013.01)

(56) References Cited

U.S. PATENT DOCUMENTS

| | | | |
|---|---|---|---|
| 4,118,891 A * | 10/1978 | Kehl | A01G 31/02 47/62 C |
| 4,149,970 A * | 4/1979 | Atkins | A01C 21/00 47/62 N |
| 4,557,071 A * | 12/1985 | Fah | A01G 27/003 47/62 R |
| 6,247,266 B1 * | 6/2001 | Borgen | A01G 27/00 47/58.1 R |
| 6,497,534 B1 | 12/2002 | McCoy | |
| 6,719,902 B1 | 4/2004 | Alvarez et al. | |
| 7,455,774 B2 | 11/2008 | Chandraghatgi et al. | |
| 7,585,132 B2 | 9/2009 | Imbrie | |
| 8,114,659 B2 | 2/2012 | Rawson et al. | |
| 8,689,819 B2 | 4/2014 | Hashimoto et al. | |
| 9,034,633 B2 | 5/2015 | Kumar et al. | |
| 9,175,258 B2 | 11/2015 | Bywater-Ekegard et al. | |
| 9,212,358 B2 | 12/2015 | Razavi-Shirazi et al. | |
| 10,004,188 B2 | 6/2018 | Williams | |
| 10,531,615 B2 | 1/2020 | Jimenez Santillana et al. | |
| 10,906,075 B2 | 2/2021 | Franssen et al. | |
| 10,973,184 B1 | 4/2021 | Yin | |
| 2001/0052199 A1 * | 12/2001 | Klein | A01G 9/02 47/65.5 |
| 2002/0088177 A1 | 7/2002 | Gergek | |
| 2005/0000903 A1 | 1/2005 | Mecs et al. | |
| 2006/0130546 A1 | 6/2006 | Beaton et al. | |
| 2010/0227381 A1 | 9/2010 | Hoag et al. | |
| 2012/0085024 A1 | 4/2012 | Leung | |
| 2013/0067812 A1 * | 3/2013 | Masters | A01G 27/06 47/79 |
| 2014/0329677 A1 | 11/2014 | Anisimova et al. | |
| 2015/0093199 A1 | 4/2015 | Borden et al. | |
| 2017/0305804 A1 | 10/2017 | Ayers et al. | |
| 2019/0297799 A1 | 10/2019 | Larue | |
| 2020/0079672 A1 | 3/2020 | Noland | |

FOREIGN PATENT DOCUMENTS

| | | | | |
|---|---|---|---|---|
| AU | 2014250680 A1 | | 5/2015 | |
| CN | 1269738 A | | 10/2000 | |
| CN | 1413963 A | | 4/2003 | |
| CN | 105265283 | * | 1/2016 | ........... A01G 27/005 |
| CN | 106914484 A | | 7/2017 | |
| CN | 107646227 A | | 2/2018 | |
| CN | 107841313 A | | 3/2018 | |
| CN | 108934251 A | | 12/2018 | |
| CN | 109679662 A | | 4/2019 | |
| CN | 110125169 A | | 8/2019 | |
| CN | 110252798 A | | 9/2019 | |
| CN | 110326462 A | | 10/2019 | |
| CN | 210017104 U | | 2/2020 | |
| DE | 20210188 | * | 10/2002 | ............. A01G 27/00 |
| EP | 2856859 B1 | | 7/2016 | |
| GB | 2389045 A | * | 12/2003 | ............. A01G 31/02 |
| JP | 2003325052 A | | 11/2003 | |
| KR | 20130089048 | * | 8/2013 | ............... A01G 9/02 |
| KR | 101363010 B1 | | 2/2014 | |

OTHER PUBLICATIONS

Australian Examination Report for Australian Application No. 2020203536, dated Jun. 23, 2022, 7 pages.
Chang, et al.: "Effect of different types of organic fertilizers on the chemical properties and enzymatic activities of an Oxisol under intensive cultivation of vegetables for 4 years", Soil Science and Plant Nutrition (2008) 54, 587-599, 13 pages.
Australian Examination Report for Australian Application No. 2020203537, dated Aug. 5, 2022, 5 pages.
Chinese Office Action for Chinese Application No. 202010475251.0, dated Aug. 2, 2022, 15 pages.
Australian Examination Report for Australian Application No. 2020203535, dated Aug. 5, 2022, 5 pages.
CNIPA Office Action for Chinese Application No. 202010476944.1, dated Jun. 6, 2022, 16 pages.

* cited by examiner

METHOD AND SYSTEM FOR INTENSIVE BIOLOGICAL HYDROSYNTHESIS, ENERGY GENERATION AND STORAGE, AND/OR TOPSOIL RESTORATION

TECHNICAL FIELD

The present invention relates to a growing unit, a system and a method for sustained energy generation, wherein the method produces water and a humified soil as by-products. Specifically, the present invention relates to a growing unit, a system and a method for stimulation of energy generation and storage which results in intensive biological hydrosynthesis.

BACKGROUND ART

Nutrient depletion in soils adversely affects soil quality and water quality and reduces crop yield and consequently poses a potential threat to global food security and agricultural sustainability. Soils can become depleted of nutrients through over tillage, erosion, leaching or through inadequate replenishment of nutrients. Nutrient depletion has been observed in soils, fields, paddies, orchards, and the like. Further contamination of soils, in particular of metal contamination, may lead to nutrient depletion and/or accumulation of metals which may bioaccumulate through the food chain.

Nutrient storage in naturally formed soils is primarily ensconced in humus—a dynamically manufactured substance which characterises fertile soils and which is largely responsible for the initial adsorption and subsequent dissipation of contaminants. Humus is also a primary repository for moisture storage in soils. The depletion of soils globally is thus a simple function of practices and processes which deplete both stored reserves of humus and the natural mechanisms by which humus is dynamically maintained. A key symptom of depleted soil is desiccation—the loss over time of soil moisture reserves which leads eventually to desertification. Systems which naturally store nutrients in soil also store water. Where water storage capacity declines, evapotranspiration results in drying of soil. In addition, systems responsible for the manufacture and maintenance of humus reserves in soil are also responsible for the biological manufacture of water or hydrosynthesis. It will be understood that the term "hydrosynthesis" is intended to refer to a process which enables the biological manufacture of water and assists in the maintenance of soil moisture reserves. Where symptomatic soil degradation has occurred, desiccation and desertification follow.

Traditionally, fertilisers have been added to nutrient depleted soils to assist in managing nutrient supply to crops. However, the addition of fertilisers to a depleted soil can accelerate soil depletion and does not of itself contribute to the rebuilding of soil nutrient reserves. In addition, key nutrients such as phosphorus, are a finite resource and are expensive to process and deliver. Phosphorus added annually to a depleted soil results in rapid locking up of the applied nutrient in a form unavailable for plant growth. Phosphorus availability requires the presence of water. Where soils are depleted and desiccation occurs, phosphorus lock-up is accentuated. Further, with the onset of global warming and shifting weather patterns, there is a concern that more intense and longer droughts will accelerate desiccation of soils and further reduce global agricultural productivity.

All and any substances which are biologically manufactured or derived are completely dependent upon the capture either directly or indirectly of solar energy. The efficiency of any process resulting in creation of an organic molecule used in a biological structure is a function of the level of efficiency of the mechanism used to capture and store solar energy which underpins the formation of that organic molecule. It follows then that the manufacture of organic molecules used to construct humus and maintain humus reserves in soil and the biological reactions which result in hydrosynthesis rely upon sustained harvesting, storage and transfer of solar energy.

Thus, there would be an advantage if it were possible to provide a sustainable method that not only replenished nutrient reserves, but also supported generation of excess moisture, which may overcome evapotranspiration and replenish soil moisture levels and water storage capacity of the soil.

It will be clearly understood that, if a prior art publication is referred to herein, this reference does not constitute an admission that the publication forms part of the common general knowledge in the art in Australia or in any other country.

SUMMARY OF INVENTION

The present invention is directed to a growing unit, a system and a method for stimulation of energy generation and storage which results in intensive biological hydrosynthesis and which may at least partially overcome at least one of the abovementioned disadvantages or provide the consumer with a useful or commercial choice.

The present invention provides a system for biological hydrosynthesis, energy generation and storage and/or topsoil restoration. In a preferred embodiment of the invention, the system of the present invention provides for sustained biological hydrosynthesis, energy generation and storage and/or topsoil restoration. Preferably, the system of the present invention provides a method for sustained biological hydrosynthesis, wherein treatment of a growth media with a substance comprising a catalyst facilitates the transfer of a biological energy generation mechanism to the growth media, wherein a byproduct of the biological activity may be water.

In use, it is envisaged that sustained biological hydrosynthesis, energy generation and storage and/or topsoil restoration may support generation of excess moisture, which may at least partially overcome evapotranspiration and replenish soil moisture levels and water storage capacity of the soil. In use, it is envisaged that large scale implementation of the method may provide a means to intensively generate a source of humified topsoil and produce an excess of moisture which may improve soil quality outside the intensive operation.

With the foregoing in view, the present invention in one form, resides broadly in a growing unit for biological hydrosynthesis, energy generation and storage and/or topsoil restoration comprising:

a container configured for growing plants and containing a growth media located therein;

a reservoir located in a lower portion of the container and associated with an outlet portion of the container, and a substantially vertical liquid inlet pipe associated with the reservoir wherein the growth media comprises a mixture including a first catalyst, wherein the first catalyst stimulates formation of a humified soil and wherein the growth media is amended with an irrigation liquid which stimulates biological activity in the growth media and in and adjacent to the reservoir.

The term "catalyst" as used herein is broadly defined as a substance that produces or generates a reaction regardless of whether it undergoes a change itself.

The term "amendment" as used herein is broadly defined as a process or action that leads to a change in the condition of the land, including a physical change, a chemical change, a biological change, or any suitable combination thereof The term "growing unit" as used herein is broadly defined as a three-dimensional space associated with a container comprising a growth media and a reservoir located therein, the three-dimensional space including the surface of the growth media and the atmosphere contiguous with the growth media, the three dimensional area of the growth media below the surface of the growth media, the reservoir and the atmosphere contiguous with the reservoir.

The growing unit for biological hydrosynthesis, energy generation and storage and/or topsoil restoration comprises a container configured for growing plants. Any suitable type of container may be used. For instance, the container may be a pot, a bucket, a barrel, a tank, an intermediate bulk container (IBC), a greenhouse, or the like. Preferably, however the container may be a structure which is substantially impervious to water and capable of containing a growth media therein.

Any suitable growth media may be used. For instance, the growth media may be soil, clay, sand, vermiculite, perlite, coir, potting mix, composted bark, decomposed granite, sphagnum peat moss, straw, or any suitable combination thereof. In an embodiment of the invention the growth media may comprise a nutrient depleted substrate. In a preferred embodiment of the invention, the growth media comprises a mixture which includes a first catalyst, wherein the first catalyst stimulates formation of a humified soil. Preferably, the mixture which includes a first catalyst may be added to the nutrient depleted substrate to form the growth media.

The growth media may be amended with an irrigation liquid which stimulates biological activity in the growth media. Any suitable irrigation liquid may be used. For instance, the irrigation liquid may be a liquid prepared from the continuous fermentation of an organic material, a liquid recovered from the one or more growing units, a liquid fertiliser, a source of water, or any suitable combination thereof.

The first catalyst and the second catalyst may be of any suitable form. However, in some embodiments of the invention, it is envisaged that the catalyst may comprise a liquor, a fertiliser (and particularly a biofertilizer) or other high value organic material, a humus or humified soil, an incubated culture, a collected substrate for energy generation, or the like. In some embodiments of the invention, the first catalyst and the second catalyst may be the same type of catalysts or may be of different types. In an embodiment of the invention, the first catalyst and the second catalyst may be the same catalyst.

In an embodiment of the invention, the catalysts may comprise a source of and/or a substrate produced by and which stimulates the activity of the one or more prokaryotic organisms. For instance, the prokaryotic organism may comprise one or more species of Archaea, one or more species of bacteria, or any suitable combination thereof. The prokaryotic organism may be anerobic, aerobic, autotrophic, heterotrophic, phototrophic, chemotrophic, photosynthetic, or any suitable combination thereof. In a preferred embodiment of the invention, the prokaryotic organisms may include purple non-sulphur producing heterotrophic photosynthetic bacteria, *lactobacillus* species, yeasts, actinomycetes species, *Nocardia* species, a ray fungi, plankton, chemotrophic bacteria, or an suitable combination thereof.

In an embodiment of the invention, the first catalyst comprises an organic substrate which includes characteristics and elements commonly found in a humified soil. In a preferred embodiment of the invention, the first catalyst comprises a humified soil prepared from the continuous fermentation of an organic material. In an embodiment of the invention, the first catalyst comprises a humified soil prepared from the continuous fermentation of an organic material, wherein the continuous fermentation process comprises a source of and provides a habitat for the sustained activity of low temperature fermentation microorganisms. In a preferred embodiment of the invention, the first catalyst comprises a humified soil prepared from the continuous fermentation of an organic material, wherein the humified soil comprises a viable source of and/or substrates produced by and which stimulate the activity of at least one of an aerobic microorganism, an anaerobic microorganism and a photosynthetic microorganism. Preferably, the first catalyst comprises a humified soil prepared from the continuous fermentation of an organic material, wherein the humified soil comprises a source of and/or substrates produced by and which stimulate the activity of heterotrophic photosynthetic bacteria and/or prokaryotic organisms including either one of Archaea or bacteria. In an embodiment of the invention, the first catalyst may be an output product produced by the method and/or system described in Australian patent no. 2014250680, the disclosure of which is incorporated herein by reference.

In use, it is envisaged that amending the growth media with a first catalyst which stimulates formation of a humified soil facilitates the sustained generation of energy, biological hydrosynthesis and/or soil restoration in and/or on the growth media. Preferably, the first catalyst facilitates the transfer of a source of and/or substrates produced by and which stimulate the activity of at least one of an aerobic microorganism, an anaerobic microorganism and a photosynthetic microorganism to the growth media, which facilitates sustained generation of energy, biological hydrosynthesis and/or soil restoration in the growth media. In use, it is envisaged that sustained energy generation and storage, biological hydrosynthesis and/or topsoil restoration results in the generation of excess moisture, which may overcome evapotranspiration and replenish moisture levels in the growth media. In particular, it is envisaged that water storage capacity of the growth media may be increased. In use, it is envisaged that excess moisture generated by biological hydrosynthesis may collect in a reservoir in the container and may be drained from reservoir via an outlet portion of the container.

In a preferred embodiment of the invention, the irrigation liquid may comprise a second catalyst. In an embodiment of the invention, the second catalyst comprises a liquid fertiliser. In a preferred embodiment of the invention, the second catalyst comprises a liquid fertiliser prepared from the continuous fermentation of an organic material. In an embodiment of the invention, the second catalyst comprises a liquid fertiliser prepared from the continuous fermentation of an organic material, wherein the liquid fertiliser may be a reconstituted microbial substrate. In an embodiment of the invention, the second catalyst comprises a liquid fertiliser prepared from the continuous fermentation of an organic material, wherein the continuous fermentation process comprises a source and a habitat for the activity of low temperature fermentation microorganisms. In a preferred embodiment of the invention, the second catalyst comprises a liquid fertiliser prepared from the continuous fermentation of an organic material, wherein the liquid fertiliser comprises a viable source of and/or substrates produced by and which stimulate the activity of at least one of an aerobic microorganism, an anaerobic microorganism, a heterotrophic microorganism and a photosynthetic microorganism. Preferably, the second catalyst comprises a liquid fertiliser prepared from the continuous fermentation of an organic material, wherein the liquid fertiliser comprises a source of and/or substrates produced by and which stimulate the activity of heterotrophic photosynthetic bacteria and/or prokaryotic organisms including either one of Archaea or bacteria. In an embodiment of the invention, the second catalyst may be an output product produced by the method and/or system described in Australian patent no. 2012283757, the disclosure of which is incorporated herein by reference.

In a preferred embodiment of the invention, the irrigation liquid may comprise a third catalyst. In an embodiment of the invention the third catalyst may comprise a liquid recovered from the one or more growing units. In this instance, it is envisaged that the third catalyst recovered from the one or more growing units may comprise excess irrigation liquid, a liquid byproduct of a biological activity in and/or on the growth media, a water byproduct of a biological activity in and/or on the growth media, or a mixture thereof. In an embodiment of the invention, the third catalyst may comprise a liquid generated as a result of biological activity in the liquid located in the reservoir.

In use, it is envisaged that using the third catalyst recovered from the one or more growing units as an irrigation liquid may transfer a source of and/or substrates produced by and which stimulate the activity of at least one of an aerobic microorganism, an anaerobic microorganism, a heterotrophic microorganism and a photosynthetic microorganism between growing units. In this instance, it is envisaged that by recirculating recovered liquid from the reservoir of the growing unit to the growth media may case the accumulation of beneficial organisms and/or substrates in and/or on the growth media and/or liquid in the reservoir.

The method is thus the process of applying the first catalyst, the second catalyst, and the third catalyst to the growing unit in a manner which facilitates the transfer of a biological energy generation mechanism to the growing unit, which results in biological hydrosynthesis and stimulates formation of a humified soil.

The container may be of any suitable size, shape or configuration. Preferably, however, the size and shape of the container may be determined at least in part by the variety of plant being grown. For instance, if the depth of the container is too shallow, root growth may be stunted. For instance, if the surface area to volume ratio of the container is too high, evaporation rates may be high resulting in a decrease in soil moisture. However, it will be understood that the size, shape and configuration of the container may vary depending on a number of factors, such as commercial considerations, the environmental conditions of the site and the size of the site. Preferably, however, the container may be configured so as to provide sufficient growth media and space for the variety of plant being grown.

The container may comprise at least one side wall and a bottom wall. The at least one side wall may define a substantially circular, oval, square, rectangular, hexagonal, or octagonal void into which a growth media may be placed. The at least one side wall may be provided in a substantially vertical orientation in use. It will be understood that the side walls do not need to be positioned so as to extend precisely vertically, and that relatively small deviations from vertical are acceptable and will not affect the performance of the invention.

The bottom wall may be of any suitable type. For instance, the bottom wall may be formed integrally with the at least one side wall, may be formed separately from the at least one side wall, or any suitable combination thereof.

The container may be fabricated from any suitable type of material. For instance, the container may be fabricated from a metal or metal alloy, a polymeric material, a cement or cement containing material, a clay or clay containing material, or any suitable combination thereof. In an embodiment of the invention, the container may be fabricated from a relatively durable polymeric material such as, but not limited to, polycarbonate, polyethylene, polypropylene, polystyrene, polyvinyl chloride, acrylonitrile butadiene styrene, polyethylene terephthalate, and the like, or any suitable combination thereof. In an embodiment of the invention, the container may be provided with resistance to an environmental factor, such as UV-resistance or water-resistance. Preferably, however, the container may be fabricated from a material or a combination of materials which is substantially water impermeable or comprises a water impermeable layer.

The growing unit for biological hydrosynthesis, energy generation and storage and/or topsoil restoration comprises a reservoir located in a lower portion of the container. In an embodiment of the invention, the reservoir may be located in proximity to the bottom wall of the container. Preferably, the reservoir may be associated with the bottom wall of the container such that at least a portion of the bottom wall of the container may form the bottom wall of the reservoir. Alternatively, the reservoir may be associated with the bottom wall of the container, such that a bottom wall of the reservoir may contact at least a portion of the bottom wall of the container. The reservoir may be associated with the bottom wall of the container by any suitable means. For instance, the reservoir may be integrally formed with the bottom wall of the container, may be held in contact with the bottom wall of the container by the weight of the growth media, may be fastened to the bottom wall of the container (using one or more mechanical fasteners, an adhesive, a heat or chemical treatment or welded using any suitable technique), may be fastened to the bottom wall of the container by frictional engagement or by providing complementary connection members (such as press fittings, snap fit features, male-female connectors, or the like), or any suitable combination thereof.

In use, it is envisaged that the reservoir may be located below the surface of the growth media. The reservoir may be located any suitable depth below the surface of the growth media. However, it will be understood that the depth may vary depending on a number of factors such as the height of the container, the amount of growth media and the variety of plant being grown. For instance, the reservoir may be located below the surface of the growth media such that the highest point of the reservoir may be about 10 cm below the surface, about 20 cm below the surface, about 30 cm below the surface, about 40 cm below the surface, about 50 cm below the surface, about 60 cm below the surface, about 70 cm below the surface, about 80 cm below the surface, about 90 cm below the surface, about 100 cm below the surface. In use, it is envisaged that plants may obtain water from the reservoir by one or more roots penetrating one or more apertures located in a surface of the reservoir.

The reservoir may comprise at least one side wall. Preferably, the at least one side wall of the reservoir defines a void therein, wherein, in use, the void contains at least a portion of the irrigation liquid therein. Preferably, however, the reservoir may be of sufficient size, shape and configuration to form a void within the container and support the weight of the growth media above it. Preferably, the reservoir may be configured so as to provide an air gap above the irrigation liquid. In use, it is envisaged that the air gap may provide a source of oxygen, carbon dioxide, or other gas for the microorganisms located in the liquid in the reservoir and/or growth media.

The reservoir may be any suitable shape and configuration. For instance, the reservoir may have a square, rectangle, semi-circle, or triangle shape in cross-section. In a preferred embodiment of the invention, the reservoir may comprise a semi-circle shape in cross-section. The reservoir may be any suitable shape in longitudinal section. For instance, the reservoir may have a square, rectangle, circular, semi-circle, or triangle shape in longitudinal section. In a preferred embodiment of the invention, the reservoir may comprise a substantially rectangular shape in longitudinal section.

The reservoir may be of any suitable size. However, it will be understood that the size of the reservoir may vary depending on a number of factors such as the size of the container, the amount of growing media and the variety of plant being grown. In some embodiments of the invention, the length of the reservoir may be substantially similar to a length of the bottom wall of the container or may be shorter in length to the bottom wall. Preferably, the reservoir may be substantially similar in length to a length of the bottom wall of the container such that a first end of the reservoir contacts a portion of at least one side wall and an opposed second end of the reservoir contacts an opposing portion of the at least on side wall.

The reservoir may be fabricated from any suitable material. For instance, the reservoir may be fabricated from a metal or metal alloy, a polymeric material, or any suitable combination thereof. Preferably, the reservoir may be fabricated from a relatively durable polymeric material such as, but not limited to, polycarbonate, polyethylene, polypropylene, polystyrene, polyvinyl chloride, acrylonitrile butadiene styrene, polyethylene terephthalate, and the like, or any suitable combination thereof. In some embodiments of the invention, the reservoir may be made from the same type of material as the container or a different type of material as the container.

In an embodiment of the invention, the reservoir may comprise one or more apertures located in a surface thereof. Alternatively, at least a portion of the reservoir may be fabricated from a lattice framework defining a plurality of spaced apertures. In use, it is envisaged that the one or more apertures may extend at least partially through at least one wall of the reservoir. The apertures may be of any suitable size, shape, or configuration. Preferably, however, the apertures may be of sufficient size, shape, or configuration to enable movement of moisture and air between the reservoir and the container and root penetration into the reservoir whilst substantially precluding movement of the growth media from the container into the reservoir and without affecting the structural integrity of the reservoir. In use it is envisaged that the apertures may comprise a width of about 0.25 mm to about 5.0 mm, about 0.5 mm to about 4.0 mm, about 1.0 mm to about 3.0 mm, about 1.5 mm to about 2.5 mm. Preferably the apertures may comprise a width of about 2.0 mm.

Preferably, the reservoir may be associated with an outlet portion of the container. The outlet portion may be of any suitable type. For instance, the outlet portion may be a tap, a valve, a hose connector, a water tank adapter, a hose tail fitting, a tank outlet fitting, a bulkhead fitting, or the like. The outlet portion of the container may be located in any suitable portion of the container. Preferably, the outlet portion of the container may be located in a lower portion of the container.

The reservoir may be associated with the outlet portion of the container in any suitable manner. In some embodiments of the invention, the outlet portion of the container may be connected to the reservoir or may be located in proximity to the reservoir. Preferably, the outlet portion of the container may be in fluid communication with the reservoir, such that excess liquid in the reservoir may drain from the outlet portion of the container. Preferably, the outlet portion of the container may be configured to be connected to an irrigation system.

The growing unit for intensive biological hydrosynthesis comprises a substantially vertical liquid inlet pipe. It will be understood that the liquid inlet pipe does not need to be positioned so as to extend precisely vertically, and that relatively small deviations from vertical are acceptable and will not affect the performance of the invention. In use, it is envisaged that at least a portion of the liquid inlet pipe may be located in the growth media and at least a portion of the liquid inlet pipe may be located above the surface of the growth media. Preferably, the at least a portion of the liquid inlet pipe located in the growth media may comprise an end of the liquid inlet pipe. In this instance, it will be understood that the end of the liquid inlet pipe located in the growth media may form an outlet end of the liquid inlet pipe and the opposing end not located in the growth media may form an inlet end of the liquid inlet pipe.

The liquid inlet pipe may be located in any suitable location relative to the container. In an embodiment of the invention, the liquid inlet pipe may be located in proximity to at least one side wall of the container. Preferably, the liquid inlet pipe may be located substantially adjacent to at least one side wall of the container, such that it may be in contact with the at least one side wall of the container. In this instance, it is envisaged that the liquid inlet pipe may be may be fastened to the at least one side wall of the container (using one or more mechanical fasteners, an adhesive, a heat or chemical treatment or welded using any suitable technique), may be fastened to the at least one side wall of the container by frictional engagement or by providing complementary connection members (such as pressing fittings, snap fit features, male-female connectors, or the like), or any suitable combination thereof. Preferably, at least a portion of the liquid inlet pipe may be fastened to the at least one side wall of the container with a pipe clip or clamp.

The liquid inlet pipe may be of any suitable shape and configuration. Preferably, the liquid inlet pipe may comprise an elongate body portion comprising an inlet end and an opposed outlet end and a bore extending therebetween. The diameter of the bore of the liquid inlet pipe may be substantially constant along its length or may vary along its length. For instance, the diameter of the bore may taper along at least a portion of its length, may include a neck or similar narrowing portion, and the like. Preferably, however, the shape and configuration of the liquid inlet pipe may be configured so as to optimise the flow rate of the irrigation liquid into the container without overflowing. It will be understood that the shape or configuration of the liquid inlet pipe may vary depending on a number of factors such as the volume and flow rate of the irrigation liquid, the type of connection between the liquid inlet pipe and the irrigation system and minimising liquid hang-up points within the liquid inlet pipe.

The liquid inlet pipe may be of any suitable size. Preferably, the liquid inlet pipe may be of sufficient size so as to receive an irrigation liquid without overflowing. For instance, a liquid inlet pipe used in a growing unit for a tree may be longer and/or wider than a liquid inlet pipe used in a growing unit for an herbaceous plant. However, it will be understood that the size of the liquid inlet pipe may vary depending on a number of factors, such as the size and shape of the container and the number of plants in the growing unit.

The liquid inlet pipe may be fabricated from any suitable material. Preferably, however the liquid inlet pipe may be fabricated from a relatively durable semi-rigid or rigid material such as, but not limited to, polycarbonate, polyethylene, polypropylene, polystyrene, polyvinyl chloride, acrylonitrile butadiene styrene, polyethylene terephthalate and the like, or any suitable combination thereof. The liquid inlet pipe may be pervious, semi-pervious, or impervious to water. Preferably, the liquid inlet pipe may be substantially impervious to water.

The liquid inlet pipe may comprise a screen located in a portion of the liquid inlet pipe in proximity to the inlet end. In use, it is envisaged that the screen may be used to prevent debris or organisms from entering the liquid inlet pipe.

The liquid inlet pipe may comprise a cap portion configured for removable connection to the inlet end of the liquid inlet pipe. In use, it is envisaged that the cap portion may be used to close the inlet end of the liquid inlet pipe so as to prevent debris or organisms from entering the liquid inlet pipe and to reduce evaporation of the liquid located in the reservoir.

The inlet end of the liquid inlet pipe may be provided with one or more connection portions configured for removable connection to an irrigation system. In this instance, it is envisaged that the irrigation system may provide an irrigation liquid directly to the liquid inlet pipe. In alternative embodiments of the invention, the irrigation liquid may be sprayed onto the growth media, may be drip irrigated, may be furrow irrigated, may be aerially applied, or any suitable combination thereof. In this instance, the liquid inlet pipe may serve as a conduit for air to enter the reservoir.

Preferably, the substantially vertical liquid inlet pipe may be associated with the reservoir. The liquid inlet pipe may be associated with the reservoir by any suitable means. Preferably, however, the liquid inlet pipe may be in fluid communication with the reservoir, such that irrigation liquid provided to the liquid inlet pipe may flow into the reservoir. For instance, the liquid inlet pipe may be integrally formed with the reservoir, may be connected to the reservoir, may be located in proximity to the reservoir, may be located within the reservoir or the like. Preferably, at least a portion of the liquid inlet pipe may be located within the reservoir. In this instance, it is envisaged that the outlet end of the liquid inlet pipe may be located within the reservoir. In use, it is envisaged that the reservoir may be provided with an aperture having a similar diameter to the liquid inlet pipe such that the liquid inlet pipe may pass at least partly through the aperture and into the reservoir.

In use, it is envisaged that excess irrigation liquid may be collected in the reservoir and may be drained from reservoir via an outlet portion of the container.

The growing unit may comprise a system for detecting moisture levels in the growing unit. Any suitable system for detecting moisture levels may be used. For instance, the moisture level of the growth media may be detected using a moisture sensor, a water level indicator system may be provided in the liquid inlet pipe, a water level indicator system may be provided in the reservoir, or any suitable combination thereof. In an embodiment of the invention, the growing unit may comprise a system that regulates and is responsive to the amount of water in the growing unit. For instance, the growing unit may comprise a system that determines a water level in the growing unit and automatically activates an irrigation system connected to the growing unit to provide an irrigation liquid to the growing unit. For instance, the growing unit may comprise a system that determines a water level in the growing unit and activates a low water level alarm.

In a second aspect of the invention, the present invention in one form, resides broadly in a system for biological hydrosynthesis, energy generation and storage and/or topsoil restoration, the system comprising:
  one or more growing units comprising
    a container configured for growing plants and containing a growth media located therein,
    a reservoir located in a lower portion of the container and associated with an outlet portion of the container, and
    a substantially vertical liquid inlet pipe associated with the reservoir,
    wherein the growth media comprises a mixture including a first catalyst,
    wherein the first catalyst stimulates formation of a humified soil,
  one or more irrigation systems configured to provide one or more irrigation liquids to the one or more growing units;
  a liquid recovery system configured to recover liquid from the one or more growing units, wherein the recovered liquid is a third catalyst,
  wherein the one or more irrigation liquids are selected from the group consisting of a second catalyst, the third catalyst, a liquid fertiliser, a source of water, and
  wherein the third catalyst comprises one or more liquids selected from the group consisting of excess irrigation liquid, a liquid byproduct of biological activity in and/or on the growth media, a water byproduct of biological activity in and/or on the growth media, a liquid generated as a result of biological activity in and/or on the liquid located in the reservoir, a source of extrinsic water.

Preferably, the growing unit of the second aspect of the invention is the growing unit according to the first aspect of the invention.

Preferably, the first catalyst, the second catalyst and the third catalyst of the second aspect of the invention are the first catalyst, the second catalyst and third catalyst according to the first aspect of the invention.

In a third aspect of the invention, the present invention in one form, resides broadly in a method for biological hydrosynthesis, energy generation and storage and/or topsoil restoration, the method comprising the steps of:
  growing one or more plants in one or more growing units, wherein each of the one or more growing units comprises a container configured for growing plants and containing a growth media located therein;
  transferring one or more irrigation liquids using one or more irrigation systems to the one or more growing units, and
  recovering a liquid from an outlet portion of each container associated with a reservoir of the one or more growing units and transferring the recovered liquid using a liquid recovery system to a storage container, wherein the recovered liquid is a third catalyst, wherein the growth media comprises a mixture including a first catalyst, wherein the first catalyst stimulates formation of a humified soil, wherein the one or more irrigation liquids are selected from the group consisting of a second catalyst, the third catalyst, a liquid fertiliser, a source of water, and wherein the third catalyst comprises one or more liquids selected from the group consisting of excess irrigation liquid, a liquid byproduct of biological activity in and/or on the growth media, a water byproduct of biological activity in and/or on the growth media, a liquid generated as a result of biological activity in and/or on the liquid located in the reservoir, a source of extrinsic water.

Preferably, the growing unit of the third aspect of the invention is the growing unit according to the first aspect of the invention.

Preferably, the first catalyst, the second catalyst and the third catalyst of the third aspect of the invention are the first catalyst, the second catalyst and third catalyst according to the first aspect of the invention.

Preferably, the irrigation system and the liquid recovery system of the third aspect of the invention are the irrigation system and the liquid recovery system according to the second aspect of the invention.

Any suitable type of plant may be grown using the method and the system of the present invention. For instance, the plant may be a food plant, a non-food plant, a medicinal plant, an ornamental plant, an aquatic plant, or the like. Preferably, however the plant may be suitable for growing in a container for at least a portion of its life cycle. The plant may be grown in the container for any suitable time. However, it will be understood that the length of time may vary depending on a number of factors, such as the type of plant, the length of the growing season for a crop and the purpose for growing the crop.

The system and method for biological hydrosynthesis, energy generation and storage and/or topsoil restoration may comprise one or more growing units. Preferably, the one or more growing units may be associated with one another. The one or more growing units may be associated with one another by any suitable means. For instance, the one or more growing units may be connected to one another, may be connected to the same irrigation system, may be connected to the same liquid recovery system, may be co-located, or any suitable combination thereof.

In an embodiment of the invention, one or more structures each comprising one or more growing units may be connected to one another. In this instance, it is envisaged that each of the one or more structures may be considered to be large scale growing units. The structures may be of any suitable type. For instance, the structures may be a physical structure, such as a greenhouse. In this instance, it is envisaged that the structure may provide a physical shelter to the one or more growing units. In some embodiments of the invention, the structure may be connected to one or more of the irrigation system and/or liquid recovery system or may be unconnected to the irrigation system and/or liquid recovery system. Alternatively, the structures may be a non-physical structure and may be defined by the number of growing units, the stage of growth of the variety of plant, the variety of plant being grown, the stage of restoration of the growth media, or the like. In this instance, it will be understood that the one or more growing units may be co-located.

The system and method for biological hydrosynthesis, energy generation and storage and/or topsoil restoration comprises one or more irrigation systems configured to provide one or more irrigation liquids to the one or more growing units. The one or more irrigation systems may be of any suitable type. For instance, the irrigation system may be a surface irrigation, sprinkler irrigation, micro or drip irrigation, subirrigation, or the like.

In an embodiment of the invention, the irrigation system may comprise two or more irrigation systems. In some embodiments of the invention, the two or more irrigation systems may be the same type of irrigation system or may be of different types. For instance, the irrigation system may comprise a surface irrigation system connected to a subirrigation system. In this instance, it is envisaged that the surface irrigation system may transfer the irrigation liquid from a source of the irrigation liquid to the growing unit, wherein the irrigation liquid may be transferred into the reservoir of the growing unit. For instance, the irrigation system may comprise two surface irrigation systems, wherein each surface irrigation system transfers one or more irrigation liquids from a respective source of the irrigation liquid to the growing unit. In some embodiments of the invention, each irrigation system of the two or more irrigation systems may be independently controlled or may be jointly controlled. For instance, the irrigation system may comprise two irrigation systems operating in parallel. In this instance, it is envisaged that the two irrigation systems may transfer the same irrigation liquid or different irrigation liquids, may be connected to the same source of irrigation liquid or to different sources of irrigation liquids, or may be connected to the same growing units or to different growing units.

The one or more irrigation systems may be located in any suitable location relative to the ground surface. For instance, substantially all of the irrigation system may be above ground, at least a portion of the irrigation system may be underground, substantially all of the irrigation system may be underground. However, it will be understood that the location of irrigation system may vary depending on a number of factors, such as the type of ground surface and the component of the irrigation system.

The irrigation system may comprise one or more pipes. Any suitable type of pipes may be used. For instance, the pipes may be substantially rigid (such as metal pipes, polyvinylchloride or PVC pipes), semi-rigid (such as polyethylene or poly pipes, or flexible (such as lay flat hoses). However, it will be understood that the type of pipes used may vary depending on a number of factors, such as the volume and pressure of the irrigation liquid, the number and location of the growing units being used and the environmental conditions.

Preferably, the irrigation system may comprise a network of pipes. Any suitable network of pipes may be used. Preferably, however, the network of pipes may be configured to transfer an irrigation liquid from a source of irrigation liquid to one or more growing units. In a preferred embodiment of the invention, the irrigation system may comprise one or more main pipes configured to transfer an irrigation liquid from a source of irrigation liquid to the system, one or more interrow pipes connected to the one or more main pipes and configured to transfer the irrigation liquid from the main pipe along the row of growing units, and one or more branch pipes connected to the one or more interrow pipes and configured to transfer the irrigation liquid from the interrow pipe to the one or more growing units. Each pipe of the network of pipes may be connected to an adjacent pipe by any suitable means. For instance, the pipes may be connected using one or more mechanical fasteners an adhesive, an adhesive tape, a heat or chemical treatment or welded using any suitable technique. Alternatively, the pipes may be connected by frictional engagement (such as a connector, an elbow, a tee, or the like), or by providing complementary connection members (such as pressing fittings, snap fit features, male-female connectors, or the like), or any suitable combination thereof.

In an embodiment of the invention, wherein one or more structures each comprising one or more growing units may be connected to one another, the irrigation system may comprise one or more main pipes configured to transfer an irrigation liquid from a source of irrigation liquid to a storage container located in proximity to the structure. The irrigation liquid stored in the storage container may be transferred through one or more interrow pipes along the row of growing units and one or more branch pipes connected to the one or more interrow pipes transfer the irrigation liquid from the interrow pipe to the one or more growing units.

The irrigation liquid may be provided to any suitable portion of the growing unit. For instance, the irrigation liquid may be provided directly to the growth media located in the container, may be provided directly to the reservoir of the container, may be provided indirectly to the reservoir of the container via the liquid inlet tube of the container, or any suitable combination thereof. Preferably, the irrigation liquid may be provided to an inlet end of the liquid inlet tube of the container.

The irrigation system may comprise one or more storage containers for storing one or more irrigation liquids. For instance, the one or more storage containers may be an Intermediate Bulk Container (IBC), a water tank, a sump, or the like. However, it will be understood that the type and size of the storage container may vary depending on a number of factors, such as the type of irrigation liquid being stored in the storage container and the volume of irrigation liquid required for the growing units.

In some embodiments of the invention, the irrigation liquid may be gravity fed or may be pumped. However, it will be understood that the means of transferring the irrigation liquid through the irrigation system may vary depending on the length of the pipe network, the diameter and type of pipes in the pipe network and the type and volume of irrigation liquid to be transferred. In some embodiments of the invention, the irrigation liquid may be manually or automatically distributed. In this instance, it is envisaged that the irrigation liquid may be transferred in response to a water level in the growing unit, may be transferred according to a predetermined regime, or any suitable combination thereof.

In an embodiment of the invention, the irrigation system may comprise one or more valves. Any suitable type of valve may be used. For instance, the valve may be a one-way or check valve, a gate valve, a ball valve, a pressure regulating valve, a solenoid or control valve, or the like. However, it will be understood that the type of valve used may vary depending on the purpose of the valve within the irrigation system. For instance, the valves may be used to start/stop the flow of the irrigation liquid, regulate the flow or pressure of the irrigation liquid, control the direction and amount of irrigation liquid transferred to one or more main pipes, one or more interrow pipes and/or one or more branch pipes, and the like. The valves may be located in any suitable location within the pipe network. Preferably, however, the valves may be located in proximity to a junction between one or more pipes. The valves may be manually or automatically actuated. In this instance, it is envisaged that an automatically actuated valve may be actuated in response to a low water level indicator associated with a growing unit.

In use, it is envisaged that using an irrigation liquid comprising liquid recovered from the one or more growing units using a growth media comprising a first catalyst and/or a liquid prepared from the continuous fermentation of an organic material may stimulate sustained generation of energy, biological hydrosynthesis and/or soil restoration in the growth media. Preferably, using an irrigation liquid comprising liquid recovered from the one or more growing units using a growth media comprising a first catalyst and/or a liquid prepared from the continuous fermentation of an organic material, facilitates the transfer of a source of and/or a substrate produced by and which stimulates the activity of one or more prokaryotic organisms to the growth media, which stimulates sustained generation of energy, biological hydrosynthesis and/or soil restoration in the growth media. In use, it is envisaged that sustained biological hydrosynthesis results in the generation of excess moisture, which may overcome evapotranspiration and replenish soil moisture levels. In use, it is envisaged that excess moisture generated by biological hydrosynthesis may collect in a reservoir in the container and may be drained from reservoir via an outlet portion of the container. In an embodiment of the invention, the liquid in the reservoir may be circulated through the growth media by capillary action.

The system and method for biological hydrosynthesis, energy generation and storage and/or topsoil restoration comprises a liquid recovery system configured to recover liquid from the one or more growing units, wherein the recovered liquid is a third catalyst. In an embodiment of the invention, the liquid recovery system may comprise two or more liquid recovery systems. In some embodiments of the invention, the two or more liquid recovery systems may be the same type of liquid recovery system or may be of different types. In some embodiments of the invention, each liquid recovery system of the two or more liquid recovery systems may be independently controlled or may be jointly controlled. For instance, the liquid recovery system may comprise two liquid recovery systems operating in parallel. In this instance, it is envisaged that the two liquid recovery systems may be connected to the same growing units or to different growing units, may transfer the recovered liquid to the same storage container or to different storage containers.

The liquid recovery system may be located in any suitable location relative to the ground surface. For instance, substantially all of the liquid recovery system may be above ground, at least a portion of the liquid recovery system may be underground, substantially all of the liquid recovery system may be underground. However, it will be understood that the location of liquid recovery system may vary depending on a number of factors, such as the type of ground surface and the component of the liquid recovery system.

The liquid recovery system may comprise one or more pipes. Any suitable type of pipes may be used. For instance, the pipes may be substantially rigid (such as metal pipes, polyvinylchloride or PVC pipes), semi-rigid (such as polyethylene or poly pipes, or flexible (such as lay flat hoses). However, it will be understood that the type of pipes used may vary depending on a number of factors, such as the volume and pressure of the recovered liquid, the number and location of the growing units being used and the environmental conditions.

Preferably, the liquid recovery system may comprise a network of pipes. Any suitable network of pipes may be used. Preferably, however, the network of pipes may be configured to transfer a recovered liquid from the one or more growing units to a storage container. In a preferred embodiment of the invention, the liquid recovery system may comprise one or more branch pipes connected to the outlet portion of the one or more growing units and configured to transfer the recovered liquid from the one or more growing units to an interrow pipe, one or more interrow pipes connected to one or more main pipes and configured to transfer the recovered liquid from the one or more interrow pipes to one or more main pipes and one or more main pipes configured to transfer the recovered liquid to a storage container. Each pipe of the network of pipes may be connected to an adjacent pipe by any suitable means. For instance, the pipes may be connected using one or more mechanical fasteners an adhesive, an adhesive tape, a heat or chemical treatment or welded using any suitable technique. Alternatively, the pipes may be connected by frictional engagement (such as a connector, an elbow, a tee, or the like), or by providing complementary connection members (such as pressing fittings, snap fit features, male-female connectors, or the like), or any suitable combination thereof.

In an embodiment of the invention, wherein one or more structures each comprising one or more growing units may be connected to one another, the liquid recovery system may comprise one or more main pipes configured to transfer a recovered liquid from the one or more growing units to a storage container located in proximity to the structure. The recovered liquid stored in the storage container may be transferred through one or more main pipes to an adjacent storage container.

The liquid recovery system may comprise one or more storage containers for storing one or more recovered liquids. For instance, the one or more storage containers may be an Intermediate Bulk Container (IBC), a water tank, a sump, or the like. However, it will be understood that the type and size of the storage container may vary depending on a number of factors, such as the type of recovered liquid being stored in the storage container and the volume of recovered liquid required for the growing units.

In some embodiments of the invention, the recovered liquid may be gravity fed or may be pumped. However, it will be understood that the means of transferring the recovered liquid through the irrigation system may vary depending on the length of the pipe network, the diameter and type of pipes in the pipe network and the type and volume of recovered liquid to be transferred. In use, it is envisaged that the recovered liquid may be gravity fed from the one or more growing units to a storage container.

The liquid recovered from the one or more growing units may comprise excess irrigation liquid, a liquid byproduct of biological activity in the growth media, a water byproduct of biological activity in the growth media, a source of extrinsic water (such as rainwater), a liquid generated as a result of biological activity in the liquid located in the reservoir, or a mixture thereof.

In use, it is envisaged that the third catalyst recovered from the one or more growing units may be used as an irrigation liquid. In some embodiments of the invention, the irrigation liquid may be used to irrigate the one or more growing units in the system or may be used to irrigate a different system. In use, it is envisaged that irrigating the growing unit with an irrigation liquid may replenish nutrient reserves and overall moisture level in the growth media. In this instance, it is envisaged that by recirculating recovered liquid from the reservoir of the growing unit to the growth media may case the accumulation of beneficial organisms and/or substrates in and/or on the growth media and/or liquid in the reservoir.

Alternatively, the third catalyst may comprise a liquid generated by biological hydrosynthesis in the one or more growing units. For instance, the liquid generated by biological hydrosynthesis may rise in evapotranspiration from the growing unit through the growth media and through the atmosphere contiguous with the growing media and return as precipitation, wherein the precipitation may include rainfall as well as the return of dewfall and humidity during atmospheric inversion events, such as the natural cycle of cooling at the end of the day. In this instance, it will be understood that the third catalyst may not be recovered from the one or more growing units but may be recycled through evapotranspiration and precipitation cycles. The liquid generated by biological hydrosynthesis may circulate through a media in the site by any suitable method by which water moves through a media. For instance, the liquid may circulate through the media by capillary action, convection, evapotranspiration, precipitation, or any suitable combination thereof.

In a preferred embodiment of the invention, the liquid generated by biological hydrosynthesis may comprise a source of and/or a substrate produced by and which stimulates the activity of the one or more prokaryotic organisms in the growing unit. In a preferred embodiment of the invention, the liquid generated by biological hydrosynthesis may facilitate the transfer of a source of and/or a substrate produced by and which stimulates the activity of the one or more prokaryotic organisms in the growing unit. In this instance, it is envisaged that the migration of the liquid by capillary action or other means through the growth media and/or the evapotranspiration of the liquid may facilitate the transfer of a source of and/or a substrate produced by and which stimulates the activity of the one or more prokaryotic organisms. In use, it is envisaged that, over time, the recycling of the third may construct a matrix of biological energy generation points in and/or on the growth media and/or liquid in the reservoir and/or the atmosphere contiguous with the growth media capable of facilitating sustained energy generation and the generation of energy storage compounds, such as a humified soil, in the growing unit.

Further, it is envisaged that the recycling of the third catalyst in the growing unit may have a beneficial effect on adjacent growing units and/or the site on which the growing units are located. In this instance, it will be understood that amending the growth media in effect amends the three-dimensional space around the growing unit, including the surface on which the growing unit is located, the three-dimensional area of the growth media below the surface of the growth media and the liquid in the reservoir, and the atmosphere above the growing unit. In use, it is envisaged that implementation of the method may increase the likelihood of precipitation and the overall precipitation received in the site on which the growing units are located. In use, it is envisaged that the stimulated biome triggered by the method includes the flourishing of *Pseudomonas* species and other species which may travel in the atmosphere of the site and which may cause the seeding of precipitation.

In an embodiment of the invention, the replenished growth media may be added to a nutrient depleted substrate and used as a growth media for growing plants. Alternatively, the replenished growth media may be added to a nutrient-depleted soil and/or a contaminated soil to assist in the restoration of the soil. In an embodiment of the invention, replenished growth media may be removed from a growing unit and a nutrient-depleted soil or growth media may be added to the growing unit. In this instance, it is envisaged that the replenished growth media may be removed while the plant is growing, after the plant has been removed from the growing unit, or after the growing season for the plant has ended.

In an embodiment of the invention, the method for biological hydrosynthesis, energy generation and storage and/or topsoil restoration constructs a matrix of biological energy generation points in and/or on the growth media, in and/or on the atmosphere contiguous with the growth media and in and/or on the reservoir below the growth media. In this instance, it will be understood that this method facilitates the transfer of a source of and/or a substrate produced by and which stimulates the activity of the one or more prokaryotic organisms to each point in the matrix, triggering the formation of a humified soil and biological hydrosynthesis and subsequent water generation at each point in the matrix. Over time, it is envisaged that construction of a matrix of biological energy generation points facilitates sustained energy generation and storage in and/or on the growth media, sustained biological hydrosynthesis and generation of water and restoration of the growth media by generation of a humified soil. In use, it is envisaged that this method results in natural nutrient accumulation, including nitrogen and carbon sequestration, accumulation of other nutrients essential for plant growth.

Preferably, the method comprises the steps of undertaking a primary amendment of a growth media, a secondary amendment of the growth media and a tertiary amendment of the growth media, wherein the primary amendment, the second amendment and the tertiary amendment of the growth media may be conducted over a period of time. The amendment regime may be conducted over any suitable period of time. However, it will be understood that the amendment regime may be conducted any suitable number of times in order to construct a matrix of biological energy generation points in and/or on the growth media capable of facilitating sustained energy generation and the generation of energy storage compounds, such as a humified soil, in and/or on the growth media. In an embodiment of the invention, the method of amending the growth media with a first catalyst, a second catalyst and a third catalyst is the method as described in Australian patent no. 2012283757, the disclosure of which is incorporated herein by reference.

In a preferred embodiment of the invention, the primary amendment of the growth media comprises the addition of the first catalyst to the growth media, such that a matrix of biological energy generation points may be constructed on about 5% of the growth media by volume.

In a preferred embodiment of the invention, the secondary amendment of the growth media comprises the addition of the second catalyst to the growth media, such that a matrix of biological energy generation points may be constructed on about 20% of the growth media by volume. In this instance, the second catalyst may be applied to the growth media directly (such as, but not limited to, irrigation with the second catalyst) or indirectly (such as, but not limited to, capillary action between the reservoir and the growth media).

In a preferred embodiment of the invention, the tertiary amendment of the growth media comprises the addition of the third catalyst to the growth media, such that a matrix of biological energy generation points may be constructed on about 75% of the growth media by volume. In this instance, the third catalyst may be applied to the growth media directly (such as, but not limited to, irrigation with the recovered liquid) or indirectly (such as, but not limited to, capillary action between the reservoir and the growth media).

The amendment regime enables the construction of a matrix of biological energy generation points in and/or on the growth media sufficient to facilitate sustained and more efficient energy generation and storage in and/or on the growth media. Preferably, thinly and randomly spreading the first catalyst during the primary amendment of the growth media results in a random distribution of a source of and/or a substrate produced by and which stimulates the activity of the one or more prokaryotic organisms across the growth media, wherein each contact point between the catalysts and the growth media becomes a biological energy generation point. In use, it is envisaged that as biological activity at each contact point increases, a matrix of biological energy generation points is constructed. As further amendments to the growth media may be undertaken with the addition of the second catalyst and/or the third catalyst, additional contact points may be created and the matrix of biological energy generation points extended over a larger area and/or increased in density in and/or on the existing amended growth media until the biological energy generation process becomes self-sustaining. Over a period of time, it is envisaged that the sustained energy generation process triggers nutrient accumulation and biological hydrosynthesis and subsequently results in the formation of a humified soil, wherein the humified soil may be an energy storage compound and a nutrient storage compound.

The present invention provided numerous advantages over the prior art. For instance, the present invention provides improved intensive crop production, especially in areas having nutrient depleted soils. In addition, it enables remediation of nutrient depleted soils by transferring one or more catalysts to the system, enabling sustained energy generation, biological hydrosynthesis and humus production. Nutrient replenished soil obtained from the system, including the one or more catalysts, may be returned to the site to assist in the remediation of the site. Recovered liquid obtained from the system, including the one or more catalysts, may be returned to the system by irrigation. In addition, use of the one or more catalysts stimulates hydrosynthesis and humus production resulting in increased water storage capacity and an excess of moisture which eventually overcomes evapotranspiration and replenishes the subsurface reservoir.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
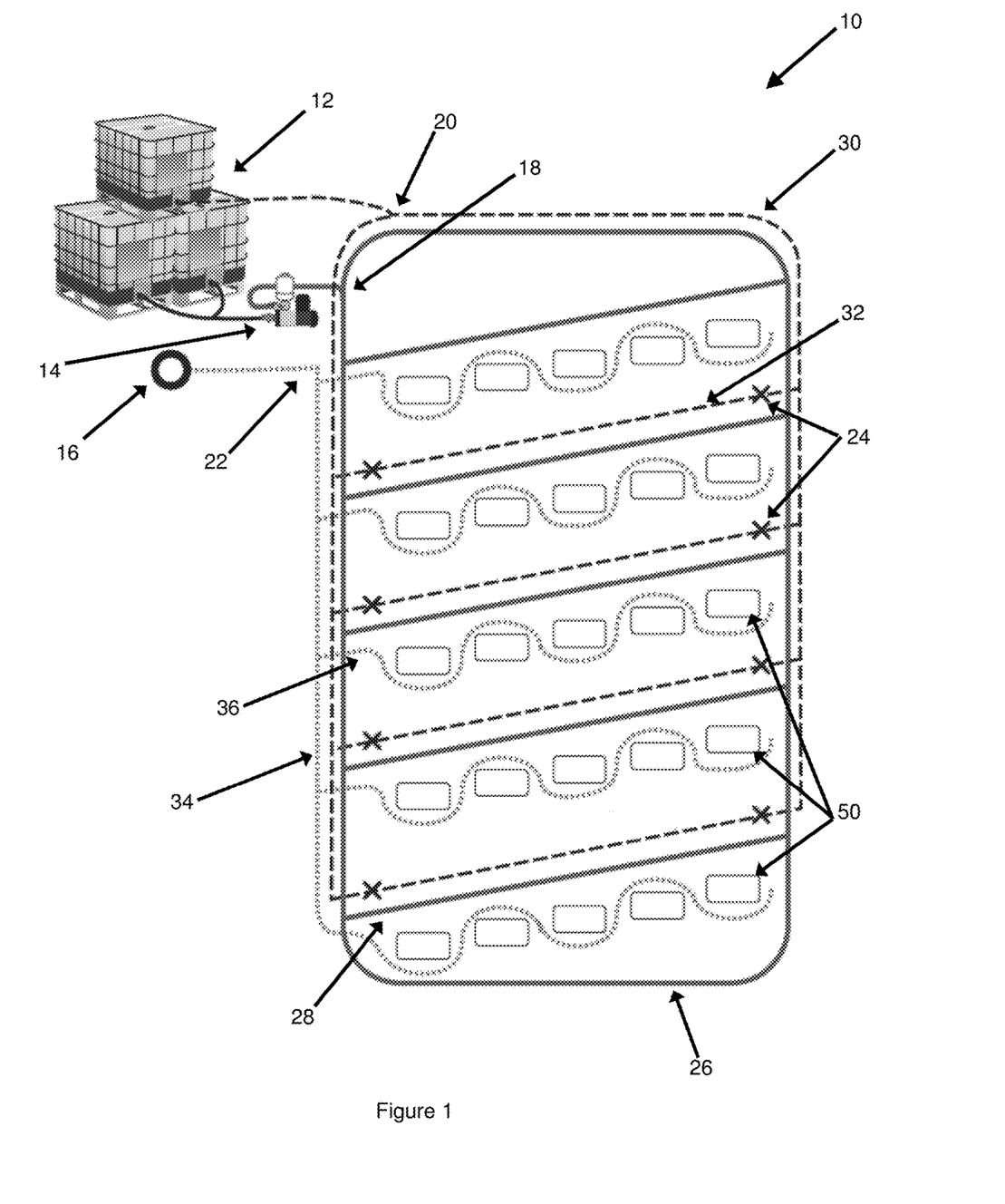
FIG. 1 illustrates a system for biological hydrosynthesis, energy generation and storage and/or topsoil restoration according to an embodiment of the invention.
Figure 2:
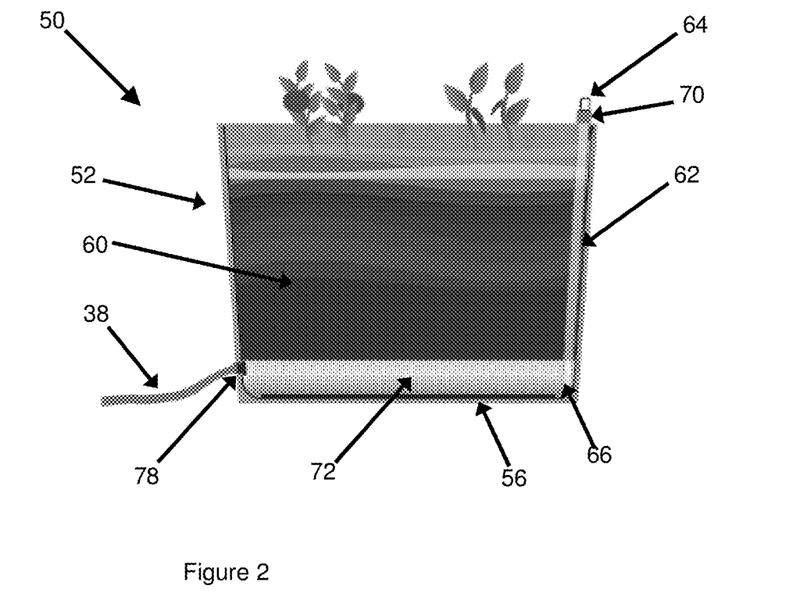
FIG. 2 illustrates a growing unit for biological hydrosynthesis, energy generation and storage and/or topsoil restoration according to an embodiment of the invention.
Figure 3:
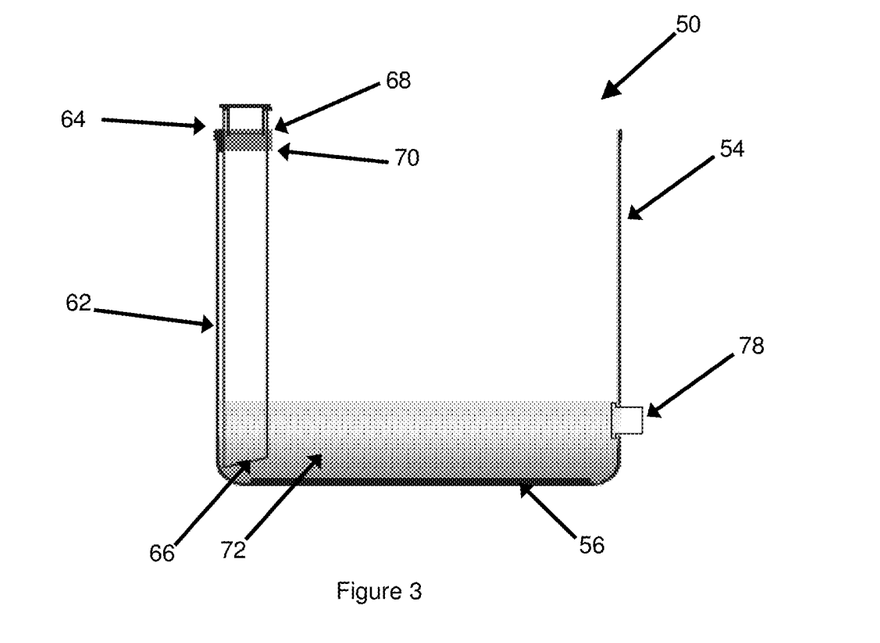
FIG. 3 illustrates a side view of a growing unit for biological hydrosynthesis, energy generation and storage and/or topsoil restoration according to an embodiment of the invention.
Figure 4:
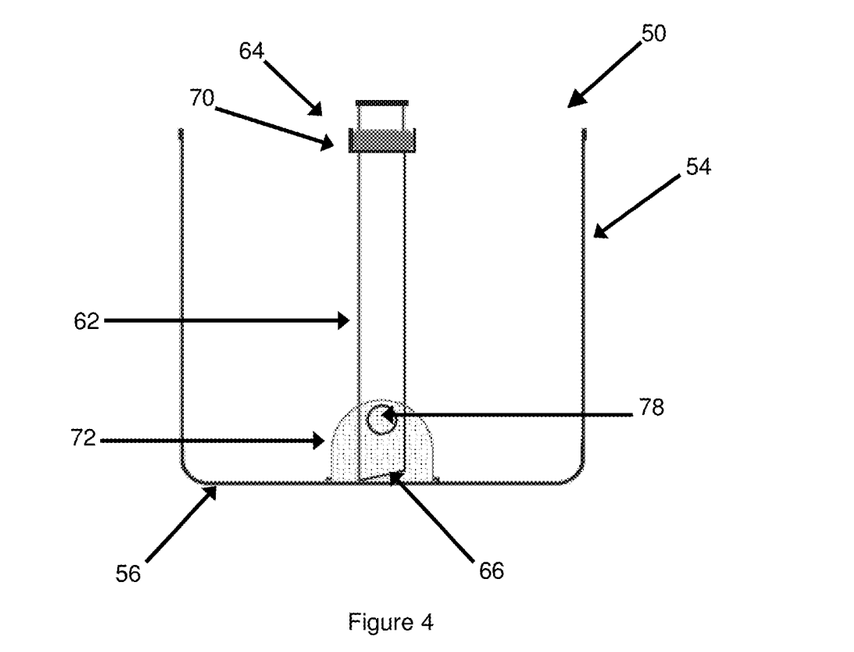
FIG. 4 illustrates an end view of a growing unit for biological hydrosynthesis, energy generation and storage and/or topsoil restoration according to an embodiment of the invention.
Figure 5:
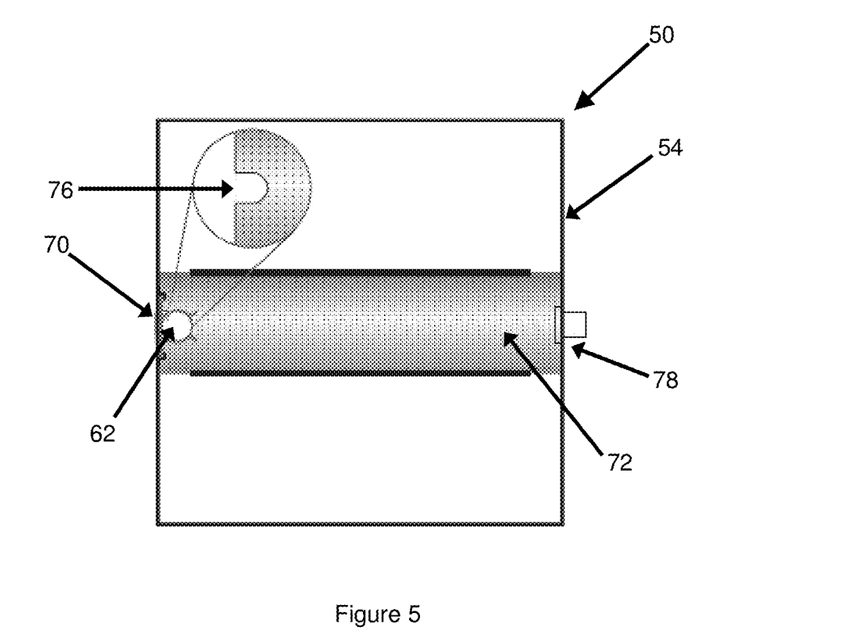
FIG. 5 illustrates a top view of a growing unit for biological hydrosynthesis, energy generation and storage and/or topsoil restoration according to an embodiment of the invention.

In FIG. 1, a system 10 for biological hydrosynthesis, energy generation and storage and/or topsoil restoration is illustrated. System 10 comprises one or more growing units 50 comprising a container 52 configured for growing plants and containing a growth media 60 located therein, a reservoir 72 located in a lower portion of the container 52 and associated with an outlet portion 78 of the container 52, and a substantially vertical liquid inlet pipe 62 associated with the reservoir 72, wherein the growth media 60 comprises a mixture including a first catalyst, wherein the first catalyst stimulates formation of a humified soil. System 10 further comprises one or more irrigation systems 18, 20 configured to provide an irrigation liquid to the one or more growing units 50, wherein the irrigation liquid stimulates biological activity in the growth media and in and adjacent to the reservoir. The irrigation liquid comprises one or more liquids selected from the group consisting of a second catalyst, a liquid recovered from the one or more growing units (a third catalyst), a liquid fertiliser, a source of water. System 10 further comprises a liquid recovery system 24 configured to recover the third catalyst from the one or more growing units 50, wherein the third catalyst comprises one or more liquids selected from the group consisting of excess irrigation liquid, a liquid byproduct of biological activity in and/or on the growth media, a water byproduct of biological activity in and/or on the growth media, a liquid generated as a result of biological activity in and/or on the liquid located in the reservoir, a source of extrinsic water.

Irrigation system 18 comprises pump 14 configured to transfer an irrigation liquid from one or more storage containers 12 in the form of IBCs through one or more main pipes 26 and one or more interrow pipes 28 to individual growing units 50 which are connected to interrow pipes 28 by one or more branch pipes (not shown).

Irrigation system 20 transfers the irrigation liquid from one or more storage containers 12 by gravity through one or more main pipes 30 and one or more interrow pipes 32 to individual growing units 50 which are connected to interrow pipes 32 by one or more branch pipes (not shown). Irrigation system 20 comprises one or more valves 24.

Liquid recovery system 22 transfers recovered liquid (the third catalyst) from one or more growing units 50 via one or more branch pipes (not shown) to one or more interrow pipes 36 and then to main pipes 34 where it is received in a sump 16.

In use, it is envisaged that liquid generated by biological hydrosynthesis may rise in evapotranspiration from the growing unit and return as precipitation, wherein the precipitation may include rainfall as well as the return of dewfall and humidity during atmospheric inversion events, such as the natural cycle of cooling at the end of the day. In this instance, it will be understood that the third catalyst may not be recovered from the one or more growing units but may be recycled through evapotranspiration and precipitation cycles.

In FIG. 2-5, a growing unit 50 for intensive biological hydrosynthesis is illustrated. Growing unit 50 comprises a container 52 configured for growing plants and containing a growth media 60 located therein, a reservoir 72 located in a lower portion of the container 52 and associated with an outlet portion 78 of the container 52, and a substantially vertical liquid inlet pipe 62 associated with the reservoir 72, wherein the growth media 60 comprises a mixture including a first catalyst, wherein the first catalyst stimulates formation of a humified soil.

Container 52 comprises at least one side wall 54 and a bottom wall 56. Reservoir 72 is located in a lower portion of container 52 and comprises a substantially dome shape in cross section. Outlet portion 78 of container 52 is in fluid communication with reservoir 72 and is configured to be connected to a branch pipe 38 to drain excess liquid from reservoir 72. Liquid inlet pipe 62 in the form of a substantially hollow tube comprises an inlet end 64 configured to be connected to a branch pipe (not shown) to receive an irrigation liquid and an outlet end 66 associated with reservoir 72. A screen 68 is located in an upper portion of the liquid inlet pipe 62 in order to filter particulate matter from entering the liquid inlet pipe. Liquid inlet pipe 62 is fastened to a side wall 54 of container 52 by a C-clip 70. Outlet end 66 is retained within reservoir 72 by frictional engagement with aperture 76.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A system for biological hydrosynthesis, energy generation and storage and/or topsoil restoration, the system comprising:

a plurality of growing units connected to one another, each of the plurality of growing units comprising:
  a container configured for growing plants and containing a growth media located therein;
  a reservoir located in a lower portion of the container and associated with an outlet portion of the container, wherein the reservoir covers a first portion of an interior bottom wall of the container such that the growth media is separated from the first portion of the interior bottom wall of the container by the reservoir and the growth media contacts a second portion of the interior bottom wall of the container; and
  a substantially vertical liquid inlet pipe located in the growth media, wherein an inlet end of the substantially vertical liquid inlet pipe is located above a surface of the growth media and an opposing outlet end of the substantially vertical liquid inlet pipe is located within the reservoir, the reservoir has a substantially dome-shaped cross-section and extends along a length of the container from a first side of the container to a second side of the container diametrically opposite the first side of the container, the substantially vertical liquid inlet pipe enters the reservoir at a first side of the reservoir, the outlet portion of the container is disposed at a second side of the reservoir opposite the first side of the reservoir, and the substantially vertical liquid inlet pipe is in abutment with the growth media about an entire outer periphery of the substantially vertical liquid inlet pipe along a length of a portion of the substantially vertical liquid inlet pipe located in the growth media,
  wherein the growth media comprises a mixture including a first catalyst, and wherein the first catalyst comprises a humified soil prepared from continuous fermentation of a first organic material,
one or more irrigation systems comprising a network of pipes configured to transfer one or more irrigation liquids configured to stimulate biological activity in the growth media and in and adjacent to the reservoir from a source of the one or more irrigation liquids to each of the plurality of growing units, wherein the one or more irrigation systems further comprise a plurality of valves configured to control flow of the one or more irrigation liquids into the inlet end of the substantially vertical liquid inlet pipe located in each of the plurality of growing units, and wherein each of the plurality of valves is associated with one of the plurality of growing units and is automatically actuated in response to a low water level indicator generated by a water level indicator system provided in at least one of the substantially vertical liquid inlet pipe or the reservoir of the one of the plurality of growing units with which the valve is associated; and
a liquid recovery system configured to recover a liquid from the plurality of growing units to the source of the one or more irrigation liquids, wherein the recovered liquid is a third catalyst,
wherein the one or more irrigation liquids are at least one of a second catalyst or the third catalyst, and
wherein the second catalyst comprises a liquid fertilizer prepared from continuous fermentation of a second organic material that is the same as or different from the first organic material.

2. A system for biological hydrosynthesis, energy generation and storage and/or topsoil restoration according to claim 1, wherein the reservoir of the growing unit is configured to contain a liquid therein and to provide an air gap above the liquid.

3. A system for biological hydrosynthesis, energy generation and storage and/or topsoil restoration according to claim 2, wherein a liquid in the reservoir of the growing unit circulates through the growth media.

4. A system for biological hydrosynthesis, energy generation and storage and/or topsoil restoration according to claim 1, wherein the outlet portion of the container is located in the lower portion of the container and wherein the liquid recovery system is configured to recover liquid from the reservoir of each of the plurality of growing units via the outlet portions of the containers.

5. A system for biological hydrosynthesis, energy generation and storage and/or topsoil restoration according to claim 1, wherein the reservoir comprises at least one side wall and wherein the at least one side wall defines a void in the reservoir.

6. A system for biological hydrosynthesis, energy generation and storage and/or topsoil restoration according to claim 1, wherein the growth media contacts a third portion of the interior bottom wall of the container, and the first portion is between the second portion and the third portion.

7. A system for biological hydrosynthesis, energy generation and storage and/or topsoil restoration according to claim 1, wherein the reservoir defines an aperture, and the outlet end of the substantially vertical liquid inlet pipe is retained within reservoir by frictional engagement with aperture.

8. A system for biological hydrosynthesis, energy generation and storage and/or topsoil restoration according to claim 1, wherein the reservoir defines a u-shaped aperture, and the outlet end of the substantially vertical liquid inlet pipe is retained within reservoir by the u-shaped aperture and a side wall of the container.

9. A system for biological hydrosynthesis, energy generation and storage and/or topsoil restoration according to claim 1, wherein the humified soil comprises at least one of a source of at least one of heterotrophic photosynthetic bacteria or prokaryotic organisms.

10. A system for biological hydrosynthesis, energy generation and storage and/or topsoil restoration according to claim 1, wherein the humified soil comprises substrates produced by at least one of heterotrophic photosynthetic bacteria or prokaryotic organisms.

11. A system for biological hydrosynthesis, energy generation and storage and/or topsoil restoration according to claim 1, wherein the humified soil stimulates activity of at least one of heterotrophic photosynthetic bacteria or prokaryotic organisms.

12. A method for biological hydrosynthesis, energy generation and storage and/or topsoil restoration, the method comprising the steps of:
  growing plants in a plurality of growing units connected to one another, wherein each of the plurality of growing units comprises a container configured for growing plants and containing a growth media located therein, a reservoir located in a lower portion of the container and associated with an outlet portion of the container, and a substantially vertical liquid inlet pipe located in the growth media, wherein the reservoir covers a first portion of an interior bottom wall of the container such that the growth media is separated from the first portion of the interior bottom wall of the container by the reservoir and the growth media contacts a second portion of the interior bottom wall of the container, an inlet end of the substantially vertical liquid inlet pipe is located above a surface of the growth media, an opposing outlet end of the substantially vertical liquid inlet pipe is located within the reservoir, the reservoir has a substantially dome-shaped cross-section and extends along a length of the container from a first side of the container to a second side of the container diametrically opposite the first side of the container, the substantially vertical liquid inlet pipe enters the reservoir at a first side of the reservoir and the outlet portion of the container is disposed at a second side of the reservoir opposite the first side of the reservoir, and the substantially vertical liquid inlet pipe is in abutment with the growth media about an entire outer periphery of the substantially vertical liquid inlet pipe along a length of a portion of the substantially vertical liquid inlet pipe located in the growth media;

transferring one or more irrigation liquids configured to stimulate biological activity in the growth media and in and adjacent to the reservoir from a source of the one or more irrigation liquids using one or more irrigation systems comprising a network of pipes to each of the plurality of growing units, wherein the one or more irrigation systems further comprise a plurality of valves configured to control flow of the one or more irrigation liquids into the inlet end of the substantially vertical liquid inlet pipe located in each of the plurality of growing units, and wherein each of the plurality of valves is associated with one of the plurality of growing units and is automatically actuated in response to a low water level indicator generated by a water level indicator system provided in at least one of the substantially vertical liquid inlet pipe or the reservoir of the one of the plurality of growing units with which the valve is associated; and recovering a liquid from the outlet portion of each container associated with the reservoir of the plurality of growing units and transferring the recovered liquid using a liquid recovery system to the source of the one or more irrigation liquids, wherein the recovered liquid is a third catalyst, wherein the growth media comprises a mixture including a first catalyst, wherein the first catalyst comprises a humified soil prepared from continuous fermentation of a first organic material, wherein the one or more irrigation liquids are at least one of a second catalyst or the third catalyst, and wherein the second catalyst comprises a liquid fertilizer prepared from continuous fermentation of a second organic material that is the same as or different from the first organic material.

13. A method for biological hydrosynthesis, energy generation and storage and/or topsoil restoration according to claim 12, the method further comprising the step of:

transferring the recovered liquid using an irrigation system to a nutrient depleted substrate and/or nutrient depleted soil.

14. A method for biological hydrosynthesis, energy generation and storage and/or topsoil restoration according to claim 12, wherein use of the growth media comprising a mixture including a first catalyst and the one or more irrigation liquids constructs a matrix of biological energy generation points in and/or on the growth media sufficient to facilitate sustained and more efficient energy generation and storage in and/or on the growth media.

* * * * *